J. McD. ALLEN.
CAN OPENER.
APPLICATION FILED JAN. 24, 1910.

960,060.

Patented May 31, 1910.

WITNESSES:
George Bambay
W. D. Patton

INVENTOR
Jasper M. Allen
BY
Munn & Co.
ATTORNEYS

UNITED STATES PATENT OFFICE.

JASPER McDONNEL ALLEN, OF ST. JO, TEXAS, ASSIGNOR OF ONE-HALF TO PATRICK P. McDERMOTT, OF ST. JO, TEXAS.

CAN-OPENER.

960,060.  Specification of Letters Patent.  Patented May 31, 1910.

Application filed January 24, 1910. Serial No. 539,715.

*To all whom it may concern:*

Be it known that I, JASPER M. ALLEN, a citizen of the United States, and a resident of St. Jo, in the county of Montague and State of Texas, have invented a new and Improved Can-Opener, of which the following is a full, clear, and exact description.

The purpose of my invention is to provide a can opener of novel, simple construction, wherein the blade is normally held near the handle but is adapted to be moved away therefrom to permit the cutting edge of the blade to be sharpened as occasion may require.

The invention consists in the novel construction and combination of parts, as is hereinafter described and defined in the appended claims.

Reference is to be had to the accompanying drawings forming a part of this specification, in which similar characters of reference indicate corresponding parts in all the views.

Figure 1:
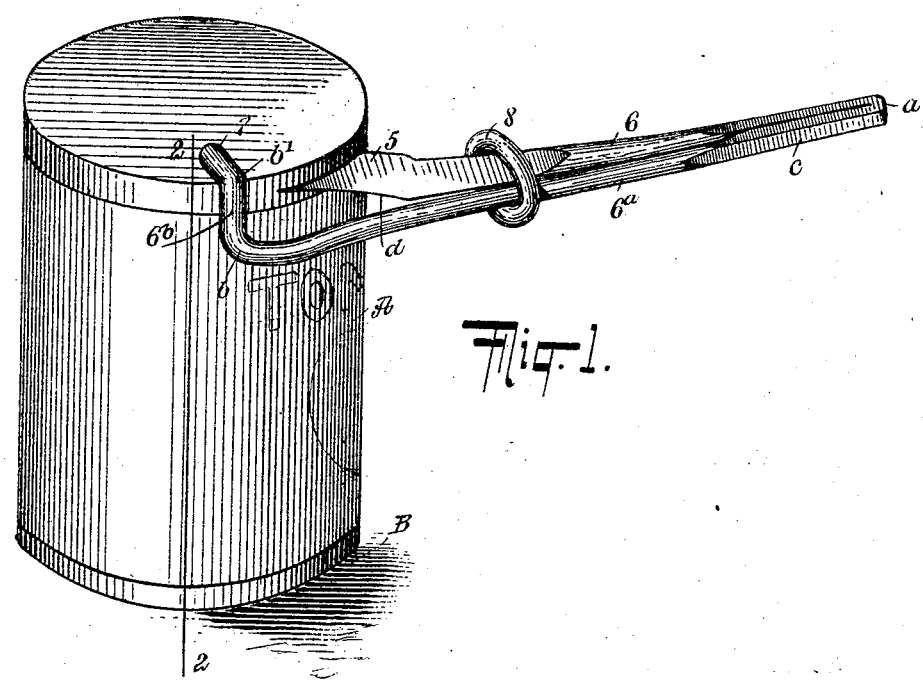
Figure 2:
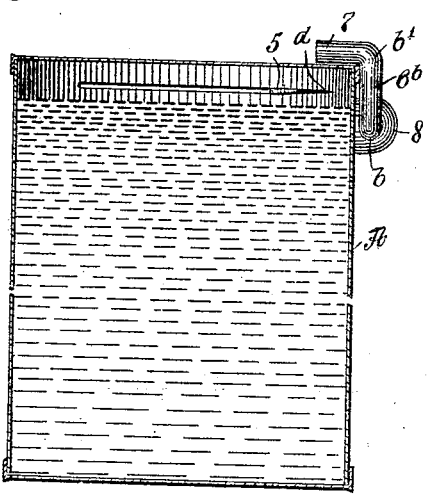
Figure 3:
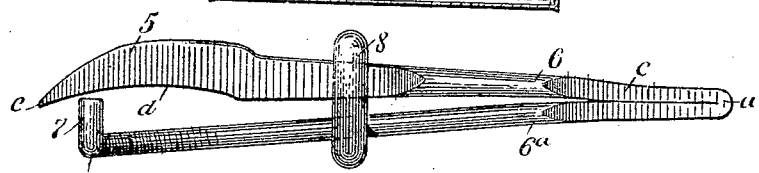

Figure 1 is a perspective view of the improved can opener applied for cutting the lid from a can; Fig. 2 is a vertical transverse sectional view, taken substantially on the line 2—2 in Fig. 1, and Fig. 3 is a detached plan view of the improved can opener.

The improved tool consists essentially of a cutting blade 5, that is formed on one end of a handle bar 6, which is return-bent at $a$ and thence extends at one side of the handle bar opposite the edge of the cutting blade, affording a complementary member $6^a$, that is bent upward at $b$ and laterally at $b'$, forming an offset toe 7, that projects toward the blade 5.

The parts briefly described are formed of a bar of steel, that is flattened as at $c$, at and near the point $a$, thus producing a folded spring that constitutes the end of the handle. The blade 5 is formed by flattening the end portion of the steel bar, that is opposite from the return-bent end $a$, and is thinned toward the edge $d$ thereof, which is concaved somewhat, as shown in Fig. 3, said cutting edge being sharpened by grinding or other means.

The handle member $6^a$ is preferably cylindrical in the body, considered from the flattened portion at and near the bend $a$ to the bend $b$ and, as shown in Fig. 1, a short upright limb $6^b$ projects from said bend, terminating in the bend $b'$, from which the toe 7 extends toward, but above, the cutting blade 5 near its point. The resilience of the return-bent members 6, $6^a$ causes a divergence of said members, so that if permitted to do so, the blade 5 will be sufficiently diverged from the toe 7 to allow said blade to be applied to a rotary grindstone or emery wheel for renewing its cutting edge.

An oblong link 8 is a completing feature of the improved utensil and, as shown, is of such dimensions as adapt it to serve as a clamp for drawing the handle members 6, $6^a$ toward each other, disposing the toe 7 at a proper distance from the cutting edge $d$ of the blade 5. The point $e$ of the cutting blade 5 is rendered sharp, and thus is adapted for an easy penetration of the side wall of a tin can that contains fruit or vegetables in preserved condition, such, for example, as shown at A in Figs. 1 and 2.

When the tool is employed for removing the lid of a fruit or other can A, the operator holds the can seated upon a table B or other support, with one hand, and grasps the handle members 6, $6^a$ in the other hand. The point $e$ of the cutting blade 5 is now applied to the side wall of the can near the top wall thereof, and adjacent to the seam in the can body. Pressure applied upon the point $e$ will cause it to penetrate the can body just below the lid. The operator now hooks the toe 7 upon the top of the can and causes the limb $6^b$ to bear against the edge of the lid, said edge serving as a fulcrum. The handle members 6, $6^a$ are now rocked so as to cause the cutting edge $d$ of the blade to advance, and cut the side wall of the can body with a shearing action, that will, by turning the can around, quickly and easily separate the lid from the body, with the exception of the upright seam thereon. The lid can now be folded away from the open top of the can and its contents be removed freely.

The extreme simplicity of the improved tool or utensil enables its manufacture cheaply, and, as the material is inexpensive, a superior device for the purpose specified is provided at a low cost.

Having thus described my invention, I claim as new and desire to secure by Letters Patent:

1. A can opener, comprising a resilient bar flattened near its center and return-bent thereat, forming two spring diverged handle members, a flat cutting blade formed on the free end of one handle member and having a concaved cutting edge, a fulcrum limb bent upward on the free end of the other handle member, a laterally-bent toe on the upper end of said limb, and projecting toward but above the cutter blade, and an oblong ring adapted, when mounted on the handle members, for holding them compressed toward each other.

2. A can opener, comprising a resilient bar doubled upon itself to form two normally diverging portions, one of said portions being flattened and sharpened to form a blade, and the other having a free end bent upward and laterally toward the blade for engaging the top of the can, and a link encircling the doubled portion of the bar for normally holding the doubled portions adjacent to each other.

In testimony whereof I have signed my name to this specification in the presence of two subscribing witnesses.

JASPER McDONNEL ALLEN.

Witnesses:
  H. D. FIELD,
  L. O. BLONTEN.